US008171596B2

(12) United States Patent
Heard

(10) Patent No.: US 8,171,596 B2
(45) Date of Patent: May 8, 2012

(54) ROLLER APPLICATOR

(76) Inventor: Rory Heard, Cape Town (ZA)

(*) Notice: Subject to any disclaimer, the term of this patent is extended or adjusted under 35 U.S.C. 154(b) by 820 days.

(21) Appl. No.: 12/167,377

(22) Filed: Jul. 3, 2008

(65) Prior Publication Data

US 2008/0276863 A1 Nov. 13, 2008

Related U.S. Application Data

(63) Continuation-in-part of application No. 12/093,625, filed as application No. PCT/ZA2007/000015 on Feb. 14, 2007.

(30) Foreign Application Priority Data

Feb. 15, 2006 (ZA) ................................ P2006/1350

(51) Int. Cl.
*A47L 13/02* (2006.01)
*B21D 53/00* (2006.01)
*A01B 29/00* (2006.01)

(52) U.S. Cl. ..................... 15/236.03; 29/895.23; 492/29

(58) Field of Classification Search ............... 15/236.03; 492/29; 29/895.23

See application file for complete search history.

(56) References Cited

U.S. PATENT DOCUMENTS

| | | | | |
|---|---|---|---|---|
| 2,528,646 | A * | 11/1950 | Galen | 15/230.11 |
| 3,033,623 | A * | 5/1962 | Thomson | 384/299 |
| 3,060,555 | A * | 10/1962 | Kirshenbaum et al. | 492/19 |
| 3,382,979 | A * | 5/1968 | Helland et al. | 210/91 |
| 4,466,349 | A * | 8/1984 | Bartlett | 101/220 |
| 4,511,361 | A * | 4/1985 | Shah | 8/471 |
| 5,779,610 | A | 7/1998 | Weihrauch | |
| 2007/0056132 | A1 | 3/2007 | Yamaguchi et al. | |

FOREIGN PATENT DOCUMENTS

| | | | |
|---|---|---|---|
| DE | 889571 | | 9/1953 |
| DE | 3825926 | | 2/1989 |
| DE | 4219239 | | 3/2009 |
| GB | 2309419 | | 7/1997 |
| JP | 2005118665 | A * | 5/2005 |
| WO | 2005037445 | | 4/2005 |

* cited by examiner

*Primary Examiner* — Dah-Wei Yuan
*Assistant Examiner* — Charles Capozzi
(74) *Attorney, Agent, or Firm* — Gold & Rizvi, P.A.; Glenn E. Gold; H. John Rizvi

(57) ABSTRACT

An application roller for applying liquid or semi-liquid substances on surfaces comprises a frame having a shaft including a handle thereon for grasping by a user and a cross axle oriented at a right angle to the shaft. A cylinder having first and second ends rotatably mounted on the cross axle defines an outer surface having a first portion of an attachment system thereon. A cover wrap dimensioned to circumferentially encompass the cylinder has a liquid absorbent outer surface and an inner surface including a second portion of the attachment system. The first and second portions of the attachment system cooperate to permit selective removal and reattachment of the cover wrap on the cylinder.

19 Claims, 6 Drawing Sheets

ROLLER APPLICATOR

CROSS REFERENCE TO RELATED APPLICATIONS

This application is a Continuation-in-Part of U.S. Non-Provisional Application Ser. No. 12/093,625, filed May 14, 2008, which claims priority to International application Ser. No. PCT/ZA07/00015 filed Feb. 14, 2007, which claims priority to foreign Application Ser. No. ZAP2006/1350 filed on Feb. 15, 2006.

BACKGROUND OF THE INVENTION

1. Field of the Invention

The present invention relates to liquid applicators in general and more particularly to a roller applicator having a removable applicator surface.

2. Discussion of the Related Art

Paints and other liquid or semi-liquid substances have been developed over the years for multitudes of purposes. Paints are used to provide a protective and decorative coating to interior and exterior building walls. Liquid glues are utilized to bond two surfaces in permanent or semi-permanent contact. Various brushes were developed to assist in applying these substances in a controlled and regulated manner in order to spread the substance over the application surface and to provide a relatively uniform coating thickness. Most commonly, the surface to which the substance is to be applied is relatively large and flat, such as the wall of a room or a building exterior, and the use of a brush becomes a very time consuming effort.

In order to more efficiently apply these coatings, an apparatus was developed that facilitated covering a larger area in a shorter period of time while simultaneously applying a more uniform coat of the substance. The apparatus that was developed has become widely known and used, and is commonly known as a 'paint roller.' The roller, which usually has a "T" shaped frame wherein the stem of the "T" includes a grip to serve as a handle for the user. The top bar of the "T" generally has a structure resembling a wire cage that freely rotates about the axis of the top bar, and a cylindrical sleeve that is telescopically received over the structure. The cylindrical sleeve is typically rigid for durability and support and has a fibrous or porous outer layer. In use, the outer layer of the cylinder is introduced to the coating substance contained in an appropriately sized reservoir such that the entire fibrous or porous outer surface absorbs a portion of the substance. The roller is then transferred to the surface on which the substance is intended to coat and maneuvered to distribute the substance in the manner desired by the user.

Upon completion of the coating process, the user is faced with the task of cleaning the roller. While the sleeve is removable from the frame allowing the frame to be readily cleaned, the task is much more difficult for the cleaning the sleeve. Since the outer surface of the sleeve is porous or fibrous, it typically retains a significant amount of the coating substance within the pores or fibers. The coating substance must be removed if the sleeve is desired to be reused for a subsequent task. The removal of the substance from the fibrous or porous material generally involves utilizing a rigid edge of some kind to squeegee out the majority of the coating substance and then to thoroughly rinse the cylinder in an appropriate solvent to remove the remaining coating substance. Since the fibrous or porous material is permanently fixed to the rigid sleeve, this task is awkward at best and can be very difficult to almost impossible at worst when the knap of the fibrous material is relatively deep. Often, when a roller sleeve is attempted to be cleaned not all of the coating substance is removed and subsequently dries leaving an inferior surface for its subsequent reuse. Although sleeves are generally sufficiently sturdy for reuse, many users become frustrated with the process of cleaning the sleeve and treat them as one-time use items and then discard the sleeves upon completion of the coating task. This is an inefficient use of resources and can result in considerable expense when compared to cleaning and reusing sleeves.

Thus what is desired is an application roller wherein the fibrous or porous layer on the roller is readily removable and can be easily cleaned for reuse.

SUMMARY OF THE INVENTION

The present invention is directed to an application roller that satisfies the need for an easily removable and cleanable application layer. The application roller for applying liquid or semi-liquid substances on surfaces comprises a frame having a shaft including a handle thereon for grasping by a user and a cross axle oriented at a right angle to the shaft. A cylinder having first and second ends rotatably mounted on the cross axle defines an outer surface having a first portion of an attachment system thereon. A cover wrap dimensioned to circumferentially encompass the cylinder has a liquid absorbent outer surface and an inner surface including a second portion of the attachment system. The first and second portions of the attachment system cooperate to permit selective removal and reattachment of the cover wrap on the cylinder.

Another aspect of the present invention is an applicator cover sleeve for a standard or pre-existing paint roller frame that has a freely rotating structure for receiving an applicator sleeve thereon. The applicator cover sleeve is constructed of a cylindrical sleeve having first and second ends and defines an outer surface having a first portion of an attachment system thereon. A cover wrap is dimensioned to circumferentially encompass the cylindrical sleeve and has a liquid absorbent outer surface for absorbing and releasing the coating substance. An inner surface of the cover wrap includes a second portion of the attachment system such that the first and second portions of the attachment system cooperate to permit selective removal and reattachment of the cover wrap on the cylindrical sleeve.

Yet another aspect of the present invention is a method for attaching a cover wrap for an application roller to a cylinder of the application roller, the method includes the steps of placing a cover wrap to be attached to an application roller on a flat surface such that the inner surface of the cover wrap faces up. The rotational axis of the application roller cylinder is aligned so that the axis is parallel to a line connecting two alignment marks on the inside surface of the cover wrap. The cylinder is registered over the cover wrap so that the cylinder is substantially centered between opposing edges of the cover wrap marked with the alignment marks. The cylinder is pressed against the inner surface of the cover wrap, and the roller is then translated in a first direction substantially perpendicular to the line connecting the two alignment marks until a first end of the cover wrap is affixed to the cylinder. Upon completion of the first translation the roller is then translated in a second direction opposite from the first direction until a second end of the cover wrap is affixed to the cylinder.

Still another aspect of the invention is an application roller including a shaft having a handle connected thereto. A circular cylinder has ends wherein each end forms a hub rotatable about the shaft. An outer layer covers the cylinder wherein the outer layer includes a plurality of small hooks extending radially outward therefrom. A non-rectangular parallelogram shaped fabric cover is dimensioned to fit on the cylinder when wrapped therearound. The cover has a fibrous surface on an inner side and has a dimension between a first pair of opposite sides equaling the length of the cylinder and a dimension between a second pair of opposite sides equaling the circumference of the cylinder.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF THE PREFERRED EMBODIMENT

Figure 1:
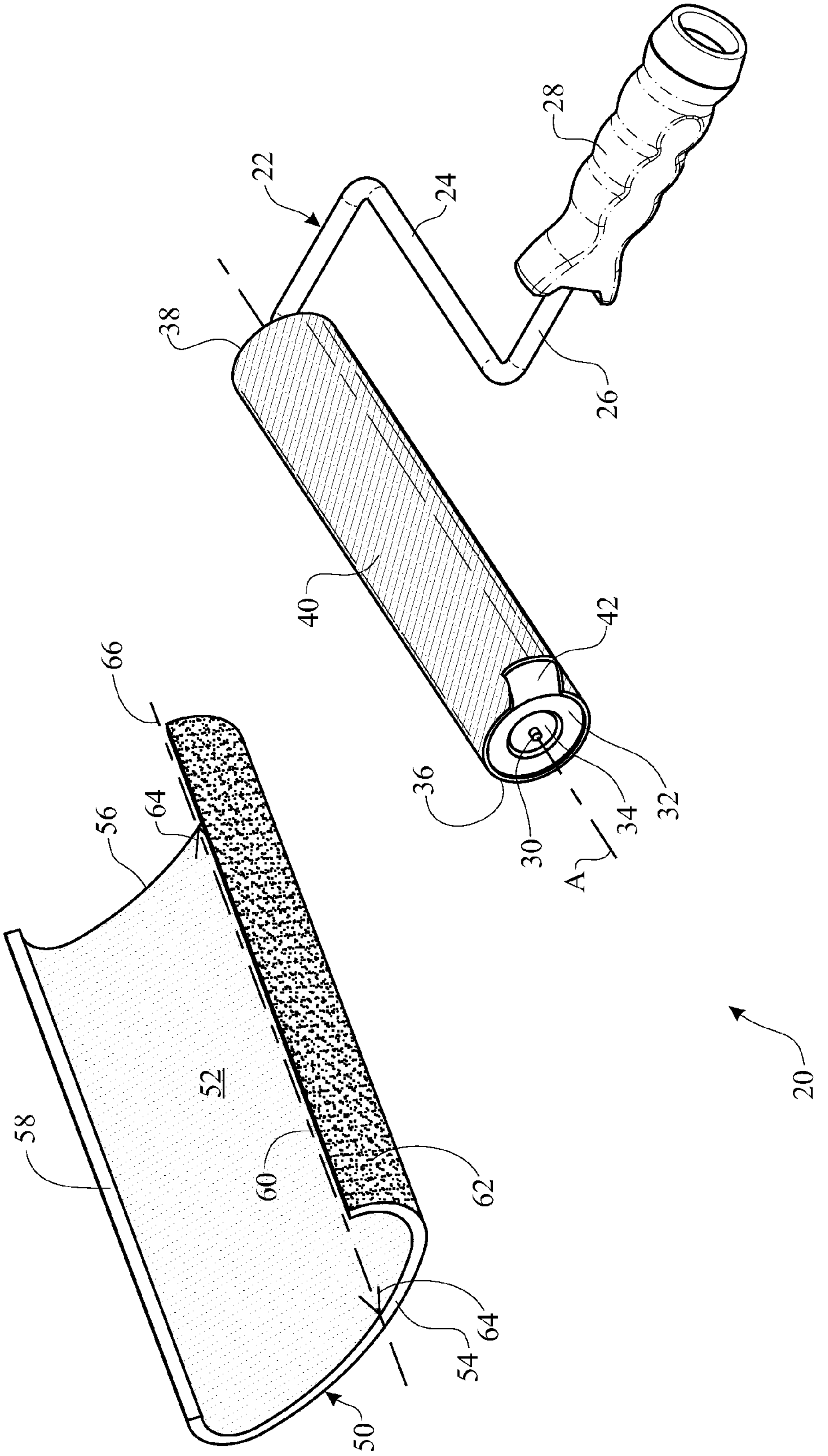
FIG. 1 is an exploded perspective view of an application roller embodying the present invention, wherein the wrap is removed from the sleeve.

For purposes of description herein, the terms "upper", "lower", "left", "rear", "right", "front", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 illustrates an application roller 20 which is one of the preferred embodiments of the present invention and illustrates its various components. Application roller 20 includes a roller assembly 22 and a removable cover wrap 50. Roller assembly 22 has a frame 24 that includes a shaft 26 on which a handle 28 is secured for comfortable grasping by the user. Frame 22 further includes a cross axle 30 which may be an integrally formed part of and extension of shaft 26. Cross axle 30 is generally oriented at right angles to shaft 26 thereby orienting frame 24 in a generally T-shaped configuration. Those skilled in the art will readily recognize that other orientations and configurations of frame 24 are possible and, although not shown herein, are intended to be within the scope of the disclosure.

A cylinder 32 is supported on cross axle 30 in a freely rotating manner about an axis 'A' by hubs 34 at each of cylinder ends 36, 38. Cylinder 32 has a length bounded by ends 36, 38 and a circumference defining an outer surface 42.

Surface 42 has attached thereto an attachment system layer 40 which substantially covers the entirety of cylinder surface 42. Layer 40 is a portion of an attachment system such as a well known hook and loop system. In the most preferred embodiment, the hook portion of the hook and loop system comprises layer 40. FIG. 1 illustrates layer 40 as being a separately formed layer which is subsequently permanently bonded to surface 42. However, cylinder 32 can be formed of a molded resin in such a manner as to integrally form the hook portion of the hook and loop fastening system as part of surface 42 without the necessity of bonding a separate hook layer to cylinder 32. Other fastening systems that permit repeated removals and reattachments are also contemplated to be within the scope of this disclosure.

A cover wrap 50 is sized to circumferentially encompass cylinder 32 and includes a liquid absorbent outer layer 62. Cover wrap 50 is typically constructed as a woven fabric wherein outer layer 62 is a fibrous pile interwoven into the fabric and is of a desired depth for absorbing a coating substance from a reservoir and then releasing the coating substance on the surface to be coated. The depth of the pile can vary depending on the resulting surface texture the user desires. Outer layer 62 can alternatively be a porous layer for yet a different type of texture. Cover wrap 50 also has an inner surface or layer 52 that comprises a second portion of the attachment system. In the most preferred embodiment, inner layer 52 comprises the loop portion of the hook and loop fastening system. Inner layer 52 can be separately formed and then permanently bonded to the woven fabric constructing cover wrap 50. Alternatively, the woven fabric of cover wrap 50 can be formed in such a manner that the loop portion of the hook and loop fastening system is integrally formed or woven with the woven fabric and outer layer pile.

Figure 2:
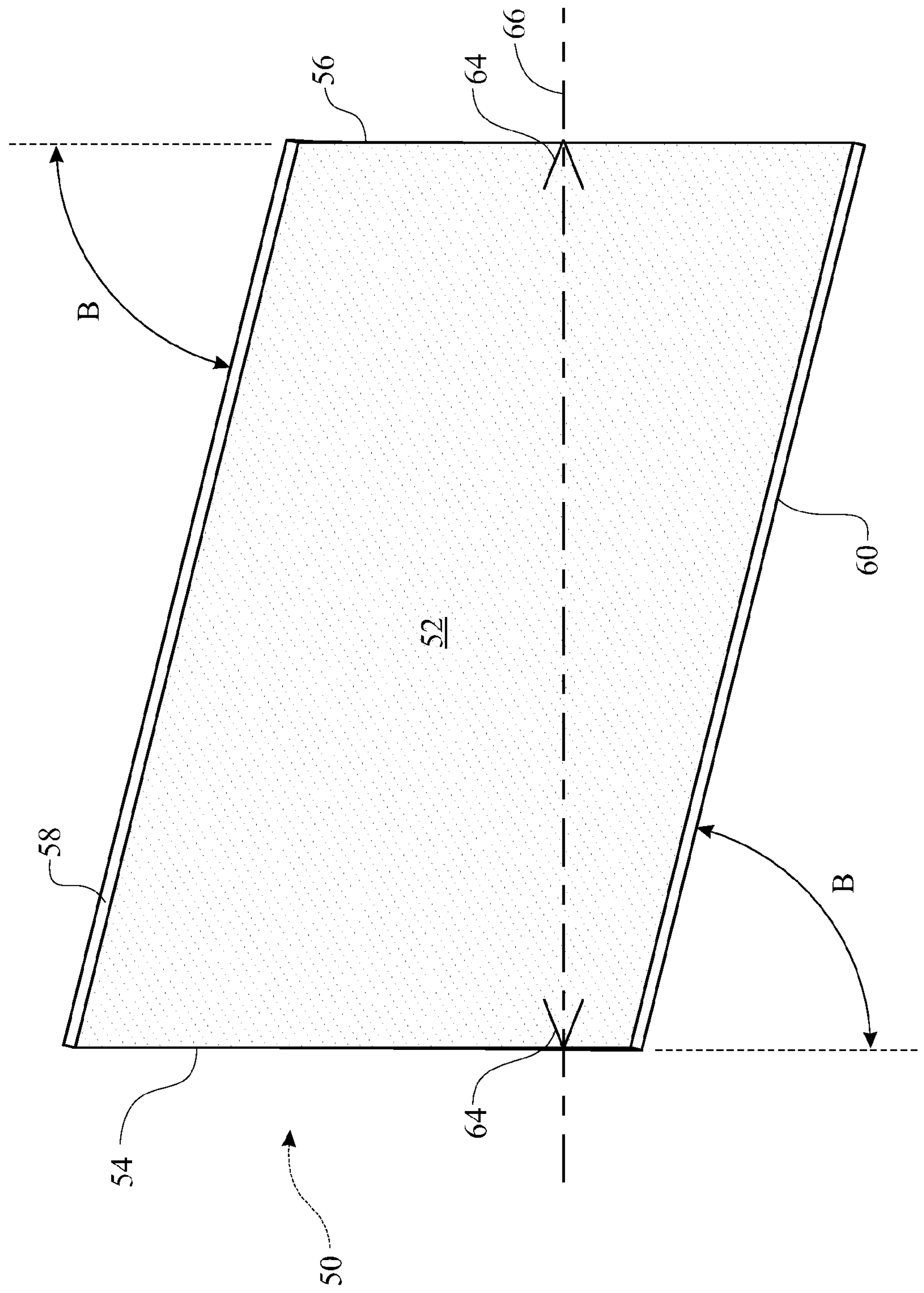
FIG. 2 is a plan view of the wrap lying on a planar surface.

Referring to FIG. 2, in a most preferred embodiment, cover wrap 50 is formed as a parallelogram and most preferably as a non-rectangular parallelogram. The parallelogram describing cover wrap 50 includes a first pair of parallel edges 54, 56 spaced one from the other by a distance substantially equal to the length of cylinder 32. Edges 58, 60 define a second pair of parallel edges of the parallelogram and are spaced apart by a distance substantially equal to the circumference of cylinder 32. The geometry of the non-rectangular parallelogram is further defined by angle 'B' in FIG. 2. Angle 'B' is typically within the range of 65 to 85 degrees, and is most preferably 75 degrees. Inner surface 52 also carries a pair of alignment marks 64. One alignment mark 64 is present at each of edges 54, 56. The marks are positioned substantially on a line 66 that is perpendicular to edges 54, 56 wherein line 66 represents the length dimension of cylinder 32.

Figure 4:
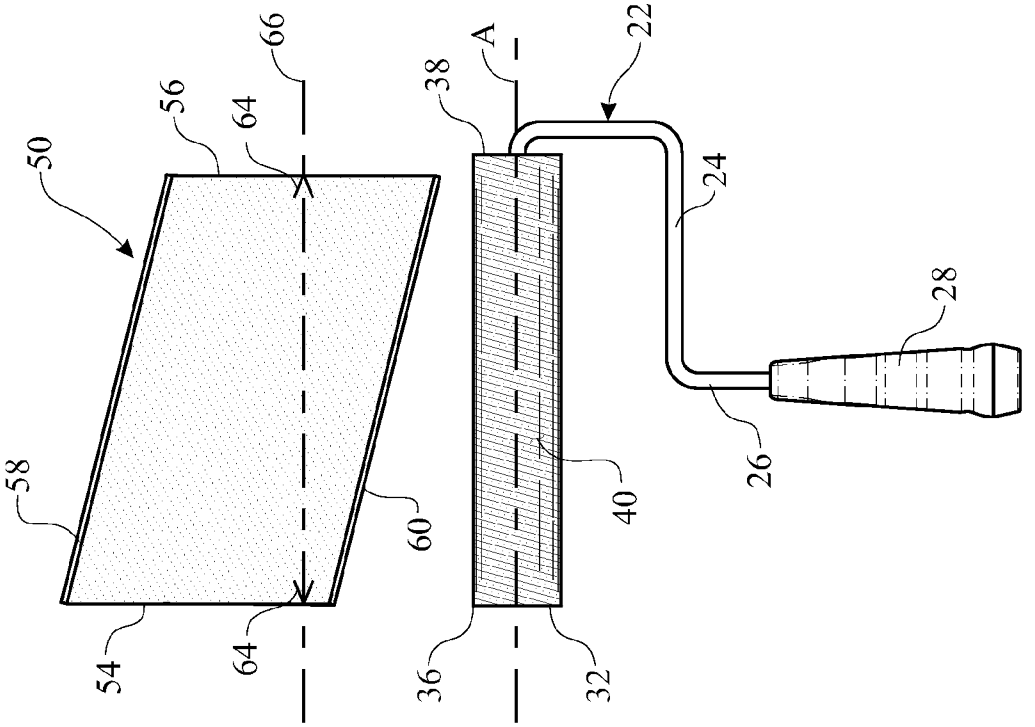
FIG. 4 is a plan view of the roller and wrap positioned to affix the wrap to the roller sleeve.
Figure 5:
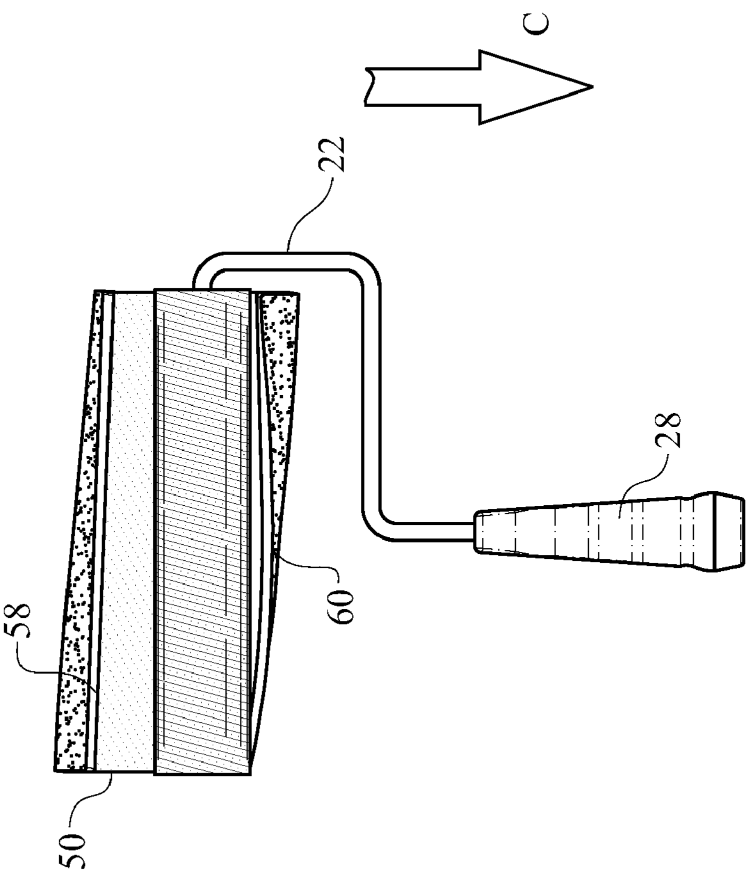
FIG. 5 is a plan view of the roller and wrap combination with the wrap partially encircling the roller sleeve.
Figure 6:
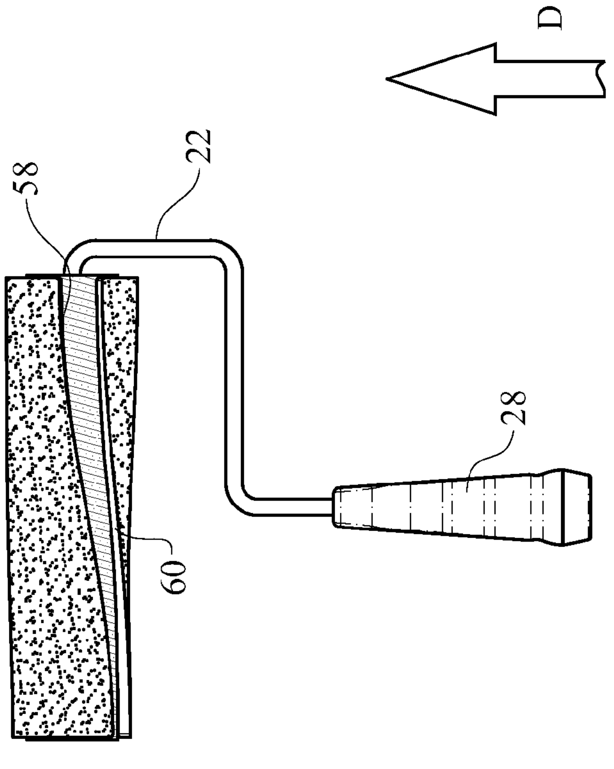
FIG. 6 is a plan view of the roller and wrap with the wrap almost fully engaged on the roller sleeve.

Referring now to FIGS. 4-6, cover wrap 50 is affixed to cylinder 32 in the following manner. Cover wrap 50 is placed on a flat surface with outer layer 62 facing against the flat surface and inner surface 52 with alignment marks 64 visible to the user. Roller assembly 22 is oriented such that rotational axis 'A' of cylinder 32 is parallel to line 66 defined by alignment marks 64. Cylinder 32 can then be registered over cover wrap 50 such that cylinder 32 is centered between opposing edges 54, 56. Once cylinder 32 has been centered and aligned with marks 64, cylinder 32 is then firmly pressed onto inner surface 52 of cover wrap 50 thereby initially engaging hooked layer 40 of cylinder 32 with the loops of inner surface 52. With a firm grip by the user on handle 28, roller assembly 22 is then translated in a first direction 'C' (FIG. 5) toward edge 60 until edge 60 is affixed to cylinder 32. The user then translates roller assembly 22 in an opposite direction 'D' (FIG. 6) toward edge 58 until edge 58 is also affixed to cylinder 32. Since the distance between edges 58 and 60 dimensionally define the circumference of roller 32, upon cover wrap 50 being completely affixed to roller 32, edges 58, 60 should be in a substantially abutting relationship on roller 32 thereby completing application roller 20.

Application roller 20 is then utilized in the same manner as previously known application rollers wherein the outer surface 62 is introduced to a reservoir of liquid coating substance in a manner sufficient to saturate the entire surface 62. Application roller 20 is then transferred to the surface to be coated and repeatedly translated thereacross until the pile of outer surface 62 requires resaturation. This procedure is repeated until the desired surface is adequately coated. To clean cover wrap 50, any corner at the intersections of edges 54, 56 with edges 58, 60 can be grasped by the user and pulled to disengage the hook and loop fastening system. Cover wrap 50 can then be place on a substantially flat surface with outer surface 62 exposed. Excess coating substance can be squeegeed out from the pile utilizing a straight-edged object if desired. Cover wrap 50 can then be placed in a washing machine and laundered as a typical cloth object and thereby resulting in a clean cover wrap 50 for reuse at a later time.

The purpose of wrap 50 being other than a rectangular parallelogram is to orient the abutment of edges 58, 60 to be other than parallel to axis of rotation 'A'. In this manner, only a single point of the abutment line of edges 58 and 60 is in tangential contact with the surface to be coated at any one time. If cover wrap were configured as a rectangle, the entire abutment line would simultaneously contact the surface at one time and thus potentially leave an undesirable visible aberration in the coating layer.

Figure 3:
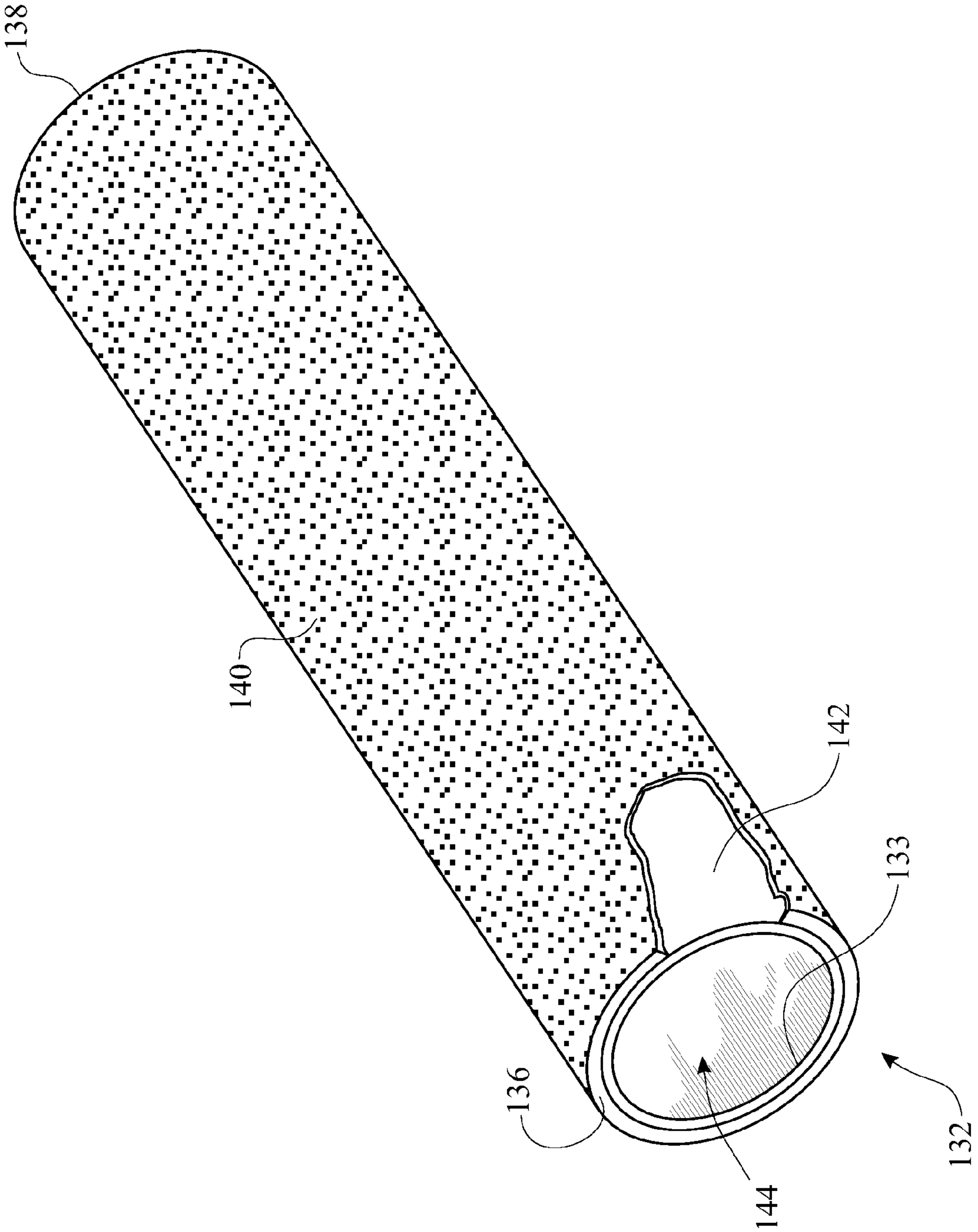
FIG. 3 is a perspective view of an alternate embodiment applicator cover sleeve for use with pre-existing roller assemblies.

Referring now to FIG. 3, an alternative embodiment employing an application cover sleeve 132 is illustrated wherein cover sleeve 132 is intended for use with pre-existing rollers. The preexisting rollers are typically configured with a rotating cage (not shown) that accepts a standard sleeve thereover. Applicator cover sleeve 132 includes a cylindrical sleeve 133 having a length bounded by ends 136, 138 and a circumference defining an outer surface 142. Sleeve 133 further defines a hollow interior 144 sized to snuggly fit over the rotating cage of a standard pre-existing roller assembly. Surface 142 has affixed thereto an attachment system layer 140 which substantially covers the entirety of sleeve outer surface 142. Layer 140 is one portion of an attachment system, such as hook layer 40 shown in FIG. 1. FIG. 3 illustrates layer 140 as being a separately formed layer which is subsequently bonded permanently to surface 142. However, cylindrical sleeve 133 can be formed of a molded resin in such a manner as to integrally form the hook portion of the hook and loop fastening system as part of surface 142 without the requirement of bonding a separate hook layer to cylindrical sleeve 133. In use, applicator cover roller 132 is sleeved over the rotating cage of a pre-existing roller assembly. A cover wrap 50 can then be selectively attached to and removed therefrom in the same manner as described above.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. An application roller for applying liquid or semi-liquid substances on surfaces, said application roller comprising:

a frame having a shaft including a handle thereon for grasping by a user, and a cross axle oriented substantially at a right angle to said shaft;

a cylinder having first and second ends, a cylinder length therebetween, and a cylinder circumference, wherein said cylinder is rotatably mounted on said cross axle, said cylinder defining an outer surface having a first portion of an attachment system thereon; and a cover wrap, said cover wrap having a shape of a parallelogram defined having a first pair of parallel edges spaced apart by a distance equal to said cylinder length and a second pair of parallel edges which are spaced apart by a distance equal to said cylinder circumference, said cover wrap having a liquid absorbent outer surface and an inner surface including a second portion of said attachment system such that said first and second portions of said attachment system cooperate to permit selective removal and reattachment of said cover wrap on said cylinder, wherein said first pair of parallel edges are aligned to said first and second cylinder ends respectively, said cover wrap is removably secured to said cylinder in a single rotation of said cylinder by engagement between said first attachment portion and said second attachment portion, wherein said second pair of parallel edges are positioned in an abutting relationship on said cylinder.

2. The application roller according to claim 1 wherein said attachment system is a hook and loop fastening system.

3. The application roller according to claim 2 wherein said hook portion of said hook and loop fastening system is a hook layer separately formed and permanently affixed to an outer surface of said cylinder.

4. The application roller according to claim 2 wherein said hook portion of said hook and loop fastening system is integrally formed as part of said outer surface of said cylinder.

5. The application roller according to claim 2 wherein said loop portion of said hook and loop fastening system is a loop layer separately formed and permanently affixed to an inner surface of said cover wrap.

6. The application roller according to claim 2 wherein said loop portion of said hook and loop fastening system is integrally formed as part of said cover wrap.

7. The application roller according to claim 1 wherein a corner angle of said parallelogram is within the range of 65 to 85 degrees.

8. The application roller according to claim 7 wherein a corner angle of said parallelogram is substantially 75 degrees.

9. The application roller according to claim 1 wherein said cover wrap includes two visible alignment marks on said inner surface, said alignment marks positioned at a periphery of said parallelogram and substantially on a line perpendicularly intersecting two parallel opposing sides of said parallelogram, said line representing said second dimension of said cover wrap.

10. An applicator cover sleeve for a paint roller frame having a freely rotating structure for receiving an applicator sleeve thereon, said applicator cover sleeve comprising:

a cylindrical sleeve having first and second ends, a cylinder length therebetween, and a cylinder circumference, said cylinder defining an outer surface having a first portion of an attachment system thereon; and a cover wrap , said cover wrap having a shape of a parallelogram defined having a first pair of parallel edges spaced apart by a distance equal to said cylinder length and a second pair of parallel edges which are spaced apart by a distance equal to said cylinder circumference, said cover wrap having a liquid absorbent outer surface and an inner surface including a second portion of said attachment system such that said first and second portions of said attachment system cooperate to permit selective removal and reattachment of said cover wrap on said cylindrical sleeve, wherein said first pair of parallel edges are aligned to said first and second cylinder ends respectively, said cover wrap is removably secured to said cylinder in a single rotation of said cylinder by engagement between said first attachment portion and said second attachment portion, wherein said second pair of parallel edges are positioned in an abutting relationship on said cylinder.

11. The applicator cover sleeve according to claim 10 wherein said attachment system is a hook and loop fastening system.

12. The applicator cover sleeve according to claim 11 wherein said hook portion of said hook and loop fastening system is a hook layer separately formed and permanently affixed to an outer surface of said cylindrical sleeve.

13. The applicator cover sleeve according to claim 11 wherein said hook portion of said hook and loop fastening system is integrally formed as part of said outer surface of said cylindrical sleeve.

14. The applicator cover sleeve according to claim 11 wherein said loop portion of said hook and loop fastening system is a loop layer separately formed and permanently affixed to an inner surface of said cover wrap.

15. The applicator cover sleeve according to claim 11 wherein said loop portion of said hook and loop fastening system is integrally formed as part of said cover wrap.

16. The applicator cover sleeve according to claim 10 wherein said cover wrap is shaped as a non-rectangular parallelogram and further wherein a first dimension of said parallelogram corresponds to a circumference of said cylinder and a second dimension of said parallelogram corresponds to a length of said cylinder.

17. The applicator cover sleeve according to claim 16 wherein a corner angle of said parallelogram is within the range of 65 to 85 degrees.

18. The applicator cover sleeve according to claim 17 wherein a corner angle of said parallelogram is substantially 75 degrees.

19. The applicator cover sleeve according to claim 16 wherein said cover wrap includes two visible alignment marks on said inner surface, said alignment marks positioned at a periphery of said parallelogram and substantially on a line perpendicularly intersecting two parallel opposing sides of said parallelogram, said line representing said second dimension of said cover wrap.

* * * * *